United States Patent [19]
Herrmann et al.

[11] 4,177,130
[45] Dec. 4, 1979

[54] APPARATUS FOR SEPARATING IONS PRESENT AS SOLUTES

[76] Inventors: Fritz Herrmann, Bruchwiesenweg 15, D-6450 Hanau 9; Abdel-Latif Bilal, Kaiserdamm 88, D-1000 Berlin 19, both of Fed. Rep. of Germany

[21] Appl. No.: 950,363

[22] Filed: Oct. 11, 1978

[30] Foreign Application Priority Data

Oct. 13, 1977 [DE] Fed. Rep. of Germany ....... 2746089

[51] Int. Cl.² .................. B01D 13/02; C02B 1/82
[52] U.S. Cl. .................. 204/299 R; 204/149; 204/151; 204/180 R; 204/300 R
[58] Field of Search ........... 204/299 R, 300 R, 180 R, 204/180 P, 149, 152, 151, 301

[56] References Cited

U.S. PATENT DOCUMENTS

| | | | |
|---|---|---|---|
| 3,728,245 | 4/1973 | Preis et al. | 204/149 X |
| 3,844,926 | 10/1974 | Smyth et al. | 204/299 R |
| 3,888,751 | 6/1975 | Minegishi | 204/149 X |
| 3,919,062 | 11/1975 | Lundquist, Jr. et al. | 204/149 |
| 3,923,629 | 12/1975 | Shaffer | 204/149 X |

*Primary Examiner*—Arthur C. Prescott
*Attorney, Agent, or Firm*—Toren, McGeady and Stanger

[57] ABSTRACT

In apparatus for separating ions in a solution by countercurrent electrolysis, a generally cylindrical column is constituted by axially juxtaposed annular segments which define respective chambers separated by liquid-permeable partitions. The two axially terminal chambers contain electrodes. Radial bores in the segments permit introduction and discharge of the solution to be tested, of an electrolyte flowing countercurrent to the solution, and of a cooling liquid passing through a cooling coil in each chamber. A shaft axially extending through the column carries agitating blades in each chamber and is magnetically rotated.

10 Claims, 5 Drawing Figures

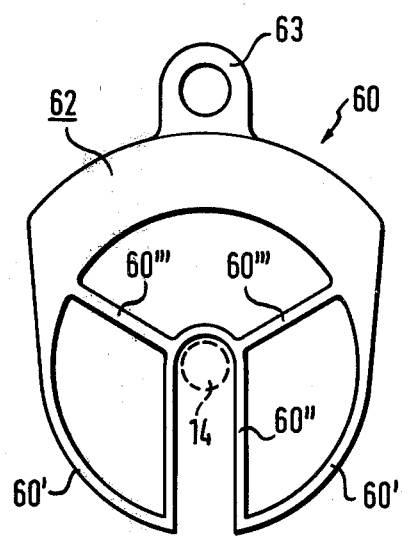
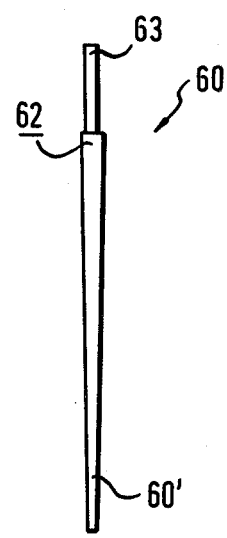
Fig.3a  Fig.3b
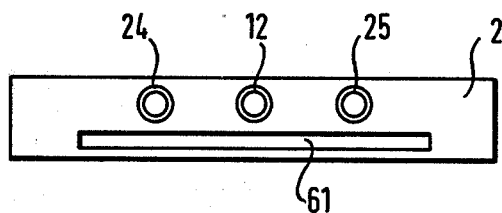
Fig.4

APPARATUS FOR SEPARATING IONS PRESENT AS SOLUTES

The invention relates to apparatus for separating ions present as solutes in a separating column by means of countercurrent electrolysis.

The basic concept of countercurrent electrolysis or countercurrent ion migration consists in exposing the ion mixture present in a solution in the separating column to an electric field in which the ions migrate with different velocities, water, organic solvents, or mixtures of both being employed in the solution. A liquid flows counter to the ion mixture migrating in the electric field at a velocity which compensates the median migration velocity of all components of the ion mixture. The faster ions thus migrate upstream, whereas the slower ions are conveyed downstream.

The difficulty of countercurrent electrolysis resides in maintaining equilibrium between the median migration velocity of the components of the ion mixture in the electric field and the flow velocity. This requires controls whose sensitivity must be the greater, the smaller differences in the mobility of the components are.

In order to overcome these difficulties, use was made either of the so-called controlled countercurrent electrolysis, or the so-called self-stabilizing countercurrent electrolysis [see Zeitschrift Chemie-Ingenieur-Technik, No. 17 (1970), pages 1090 etc.]. The equilibrium between flow velocity and the median migration velocity establishes itself automatically during self-stabilizing countercurrent electrolysis by holding the rate of through-flow of the countercurrent liquid and the current strength of the electrolysis constant (see also U.S. Pat. No. 3,932,225).

The devices known from the mentioned, earlier, printed publications which rely on the principle of self-stabilizing countercurrent electrolysis for the separation of ion mixtures consist of open, partitioned troughs of various geometric shapes as separating columns. Even though satisfactory results are achieved thereby difficulties arise particularly when operations are to be performed at low concentrations and when a precise control of the separating process is to occur.

A portion of the electrolysis liquid, for example, evaporates in an uncontrolled manner over the length of the separating column so that a constant rate of through flow of the counter-current electrolyte is not available over the entire length of the trough or column. Liquid losses also occur in the capillary interstices of the partitions and side walls, whereby salt deposits are formed there and a continuous disturbance of the equilibrium takes place.

Working under a protective gas atmosphere with certain solutions sensitive against atmospheric oxygen or carbon dioxide is possible only with the aid of complex devices.

It is the aim in such separating column not to have any concentration gradient in the solution, if possible, in the direction perpendicular to the longitudinal column axis, that is, to the separation axis. Even when the separating column or separating trough is equipped with a cooling system on its outside so that thermal convection is generated in the solution for mixing the same, this expedient does not suffice in some cases to eliminate concentration gradients entirely. Also, the heat transfer from the cooling system to the solution, and thus the cooling capacity, was often insufficient with this cooling system.

Additionally, it is often difficult to withdraw samples from the separating column for control of the separation process. Furthermore, it is not always possible to measure the temperature profile which is important for controlling the separation process.

It is the object of the invention to improve the construction of apparatus of the type initially mentioned in such a manner that the separation process occurs more precisely and can be controlled better than heretofore, and that the apparatus is additionally capable of being adapted readily to different separation problems.

This object is achieved according to the invention by the separating column, preferably subdivided into individual, juxtaposed separating chambers, being constructed as a closed unit.

Preferably the separating column is assembled from individual, stacked and connected segments serving as separating chambers, the segments in turn being constituted by sleeves, preferably of circular cross section, whose sleeve axis coincides with the longitudinal axis of the separating column, the segments being formed with bores leading outwardly at right angles to the sleeve axis with suitable connectors for feeding the dissolved ion mixture and the electrolyte, for withdrawal of samples, for admitting and releasing gases, and for introducing temperature measuring devices.

Because of the closed design of the separating column, any evaporation of the electrolyte and the resulting variation in the through-flow rate are avoided. Also salt deposition in the upper, capillary unterstices of the partitions and side walls is avoided. Because of the closed construction of the separating column, it is simple to operate under a protective gas atmosphere by joining the connectors for gas admission and release with a closed protective gas circuit.

The separating chambers constituted by the segments have each a cooling coil running along the inner wall of the segment and leading outward. Direct and substantially better cooling and temperature stabilization in the solution in the separating column is achieved thereby.

The separating chambers of the separating column constituted by the segments are separated from each other by diaphragms fastened on supporting frames between the segments. An agitating shaft equipped with stirring blades gyrating in the separating chambers is arranged in the supporting frames in the longitudinal axis of the separating column, projects from the separating column, and is sealed to the same.

Stirring of the solution in the separating column ensures that practically no concentration gradient occurs in a direction at right angles to the longitudinal column axis, that is, the separation axis. Moreover, heat transfer from the cooling system to the solution and thereby the cooling effect and also the temperature stabilization are improved thereby. For this reason, the result of sample withdrawals become more precise. Because the diaphragms additionally cover the entire cross section of the separating chambers, a uniform, laminar flow pattern results in the separating chambers, whereby a very good temperature control is possible. In connection with the stirring-through of the chamber contents, a concentration profile extending into the chambers, occuring otherwise with insufficient mixing and causing defective sample withdrawal, is avoided.

Because of the assembly of the separating columm from individual segments, the length of the separating column can be changed in a very simple manner in order to adapt the column to different separation problems.

The invention will be described with reference to two specific embodiments with reference to the drawing in which:

FIG. 3a is a front view of a supporting frame for a diaphragm in a modified separating column according to the invention;

FIG. 3b is a lateral view of the supporting frame according to FIG. 3a;

FIG. 4 shows a segment for a separating column modified for receiving the supporting frame illustrated in FIG. 3a, in top plan view.

Figure 1:
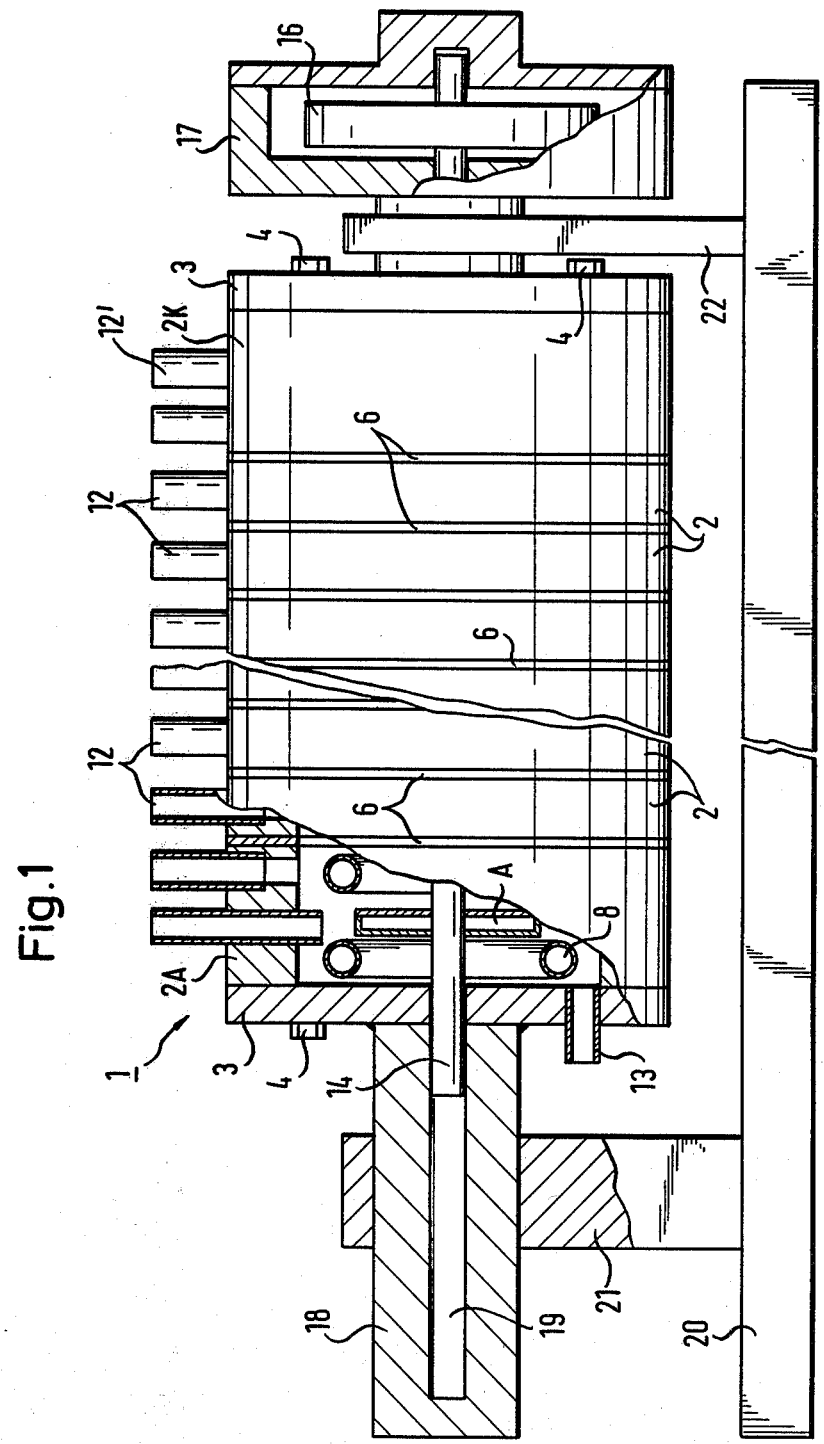
FIG. 1 shows a separating column for separating ion mixtures according to the invention in partly sectional side elevation.
Figure 2:
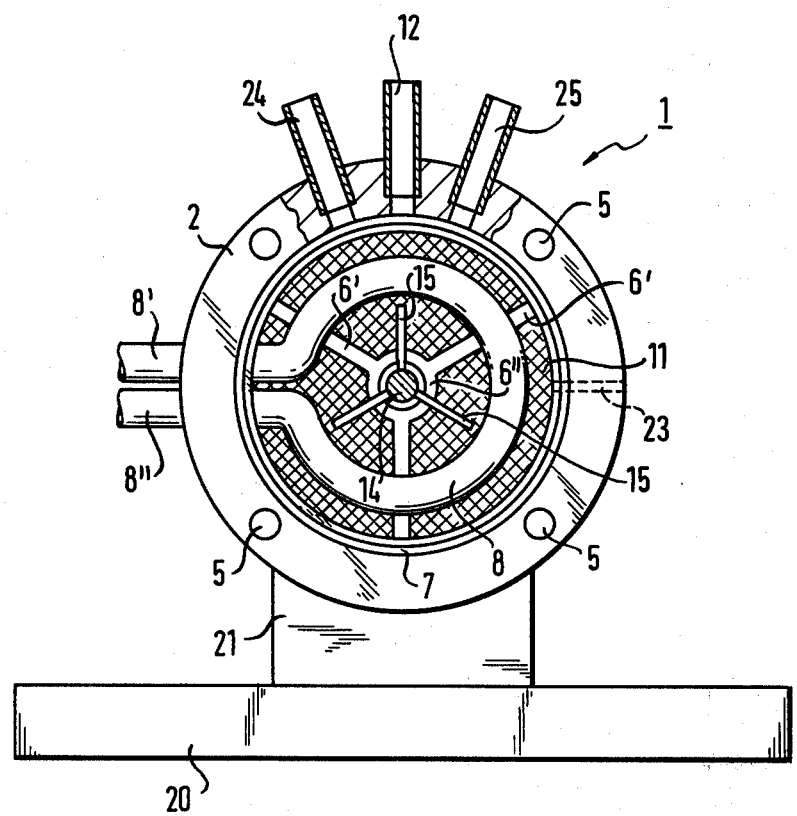
FIG. 2 shows an individual segment of the separating column of FIG. 1 in partly sectional front view.

A separating column 1 consists of several stacked segments 2, which are constituted by sleeves of circularly annular cross section. The number of stacked segments is chosen according to the requirements of the separation process and can be adapted to suit the same. The two outer segments are a little wider than the others and constitute an anode chamber 2A with anode A and a cathode chamber 2K with a cathode, not shown here. The separating column is closed at both ends by covers 3. The segments 2 and the covers 3 are interconnected by tie bolts 4 extending through the entire separating column through bores 5 in the segments and covers. Thin supporting frames 6 are arranged between respective pairs of segments. The outer rim of each frame is also a circular ring corresponding to the rim of the segments, and the frame has internally a star-shaped configuration of three bars 6' converging toward the longitudinal axis of the separating column and connected by a central, circular ring 6''.

A groove 7 is formed in one circularly annular surface of each segment 2 for insertion of an O-ring, not shown here, in order to seal the individual circular segments tightly from each other. A cooling coil 8 is arranged in a radial plane concentrically to the inner wall of the individual, sleeve-shaped segments 2, and the two connectors 8', 8'' of the coil are led out of the segment in sealed relationship.

A flow-permeable diaphragm 11 consisting, for example, of nylon gauze and covering the entire, open cross section of the segment 2 is fastened on the supporting frame 6.

The segments have respective radial bores with suitable connectors 12 by means of which an electrolysis liquid or an ion mixture to be separated may be introduced into the separating column which thus consists of several separating chambers bounded by the segments and separated from each other by the diaphragms.

The bore with connector 12' which leads into the cathode chamber 2K normally serves for supplying the electrolysis liquid which is withdrawn from the anode chamber 2A through a lower connector 13.

The ion mixture to be separated may be introduced into the separating column, in principle, at each connector 12 of the individual segments. The selection of the connector is adapted to the specific separating process.

An agitator shaft 14 is journaled in the central bores of the supporting frames 6 for the diaphragms and is connected with three agitating blades 15 in each separating chamber formed by the segments. One end of the agitating shaft 14 carries a magnet 16 which is journaled in a housing 17 mounted outside the separating column and driven in a known manner. It is to be noted that the electrolysis liquid may also be introduced into this closed housing instead of the connector 12'.

The other end of the agitating shaft 14 passing through the cover 3 extends into a sleeve-shaped sealing element 18 which, in turn, is tightly connected with the cover 3. The sealing element 18 has a central bore 19 receiving the agitating shaft 14 so as to permit lengthening or shortening of the separating column by adding or omitting individual segments without causing sealing problems at the point of passage of the agitating shaft through the cover 3. The length of the agitating shaft 14 is adapted to the greatest desired column length, and the length of the bore 19, to the shortest column.

The assembled separating column 1 is held in a frame consisting of a base plate 20 and two uprights 21, 22. The upright 21 envelops the sealing element 18 whereas the upright 22 supports the separating column at the end directed toward the magnet 16 on the agitating shaft.

During the known countercurrent electrolysis process, not to be described here in detail, the contents of the individual separating chambers are continuously mixed by rotation of the agitating shaft 14, the agitating blades 15 in all separating chambers being axially aligned whereby very good heat transfer to the cooling liquid flowing through the cooling coil 8 from the solution in the separating column is provided. As mentioned above, a radial concentration gradient in the solution is also avoided thereby.

To permit inspection and control of the separation process, the segments 2 are equipped with radial bores 23 through which samples may be withdrawn from the individual separating chambers; also, temperature sensors, not shown here, may be introduced into these bores 23 so that the temperature distribution during the separating process may be measured and controlled accordingly, for example, by adjusting the cooling.

At least the two outer segments 2A and 2K are equipped with respective connectors 23, 25 which flank the connectors 12 on both sides and serve, for example, for aerating the separating column. The connector 24 may also be employed as a gas inlet for a protective gas, the connector 25 then serving as a gas outlet. The connectors 24, 25 in this case are connected with a closed protective gas circuit. Working under a protective gas thus does not present a problem.

The afore-described closed separating column is suitable for any separation of ion mixtures. Processing highly toxic substances, such as trans-uranium elements, is possible without problems because special shielding is not necessary here.

FIGS. 3a and 3b show a supporting frame for a non-illustrated diaphragm. This supporting frame is employed with a separating column slightly modified as compared to the afore-described embodiment, this supporting frame with the diaphragm being capable of being replaced during operation of the separating column. The separating column differs only insignificantly from the afore-described separating column. The individual segments are only provided with additional, non-illustrated supports for the agitating shaft because the latter is carried no longer by the supporting frame of the diaphragm. The individual segment 2 are formed with slots 61 having the width of the supporting frame 60, and being arranged at the upper side of the segments, that is, on the side on which the connectors 12 are arranged, and near one of the circularly annular surfaces as shown in FIG. 4.

The supporting frame 60 includes an arcuate supporting element 62 equipped with a gripping lug 63. The supporting element 62 merges with two circular arcuate supporting bars 60' connected by a U-shaped bar 60" whose bight portion envelops the agitating shaft 14, shown in broken line, when the supporting frame 60 is inserted into the separating column through the slot 61. Two further straight bars 60''' are provided and radially diverge outward toward the supporting element 60 from the curved center of the arcuate bar 60". A diaphragm, not shown is fastened on this supporting frame 60, the size of the supporting frame and of the diaphragm being matched to the open circular area of the individual segments and completely covering the same.

At least that portion of the supporting frame 60 which is received in the slot 61 in the segments in the inserted condition of the frame is of wedge-shaped cross section. The slot 61 in the segments also is wedge-shaped in cross section in order to ensure a good fit with tightly sealing engagement.

It is possible, of course, to select the cross section of the segments of the separating column otherwise, for example, to make it rectangular or triangular. The other described elements, of course, must be adapted correspondingly to this cross section.

As to the material from which the segments are made, it only needs to satisfy the requirement that it be a good electrical insulator and chemically and physically stable under the conditions of the intended application. The same holds for the cooling elements.

We claim:

1. Apparatus for separating ions present as solutes in a solution comprising:
   (a) a separating column having an axis and extending in a closed loop about said axis to define a cavity, said column being capable of holding said solution in said cavity;
   (b) a plurality of partitions permeable to said solution and axially dividing said cavity into a plurality of chambers,
   (1) the portions of said column exposed to said solution in said cavity and said partitions consisting of electrically insulating material; and
   (c) two electrodes in respective, axially spaced chambers.

2. Apparatus as set forth in claim 1, wherein said column includes a plurality of segments radially bounding respective ones of said chambers and axially juxtaposed in sealed relationship, each segment being formed with at least one bore leading radially outward from the chamber bounded by said segment.

3. Apparatus as set forth in claim 2, wherein each segment is of circular cross section about said axis.

4. Apparatus as set forth in claim 2, a cooling coil in each chamber, each segment being provided with a radial inlet and a radial outlet for the cooling coil in the chamber bounded thereby.

5. Apparatus as set forth in claim 4, wherein said cooling coils extend in a plane transverse to said axis.

6. Apparatus as set forth in claim 2, wherein said partitions each include a frame sealed between two axially contiguous segments, and a diaphragm on the frame.

7. Apparatus as set forth in claim 2, wherein each segment is formed with a slot in a plane transverse to said axis, one of said partitions being received in said slot for sliding movement in said plane into and out of said cavity.

8. Apparatus as set forth in claim 7, wherein each segment has two faces axially bounding said slot and converging in a radially inward direction, said partition having two faces conformingly engaging said faces of the segment respectively, when said partition is moved into said cavity.

9. Apparatus as set forth in claim 2, further comprising an elongated shaft axially passing through said chambers and said partitions, an agitating blade on said shaft in each chamber, and drive means for rotating said shaft.

10. Apparatus as set forth in claim 9, wherein one longitudinal end of said shaft is journaled in a bearing sealed to said column with a longitudinal clearance at least equal to the axial width of one of said segments.

* * * * *